(12) United States Patent
Roundtree et al.

(10) Patent No.: US 8,495,494 B2
(45) Date of Patent: Jul. 23, 2013

(54) METHOD AND SYSTEM FOR MAPPING A VIRTUAL HUMAN MACHINE INTERFACE FOR A MOBILE DEVICE

(75) Inventors: Brian Roundtree, Kirkland, WA (US); Jake Armstrong Russell, Bellevue, WA (US)

(73) Assignee: Nuance Communications, Inc., Burlington, MA (US)

( * ) Notice: Subject to any disclaimer, the term of this patent is extended or adjusted under 35 U.S.C. 154(b) by 926 days.

(21) Appl. No.: 12/102,813

(22) Filed: Apr. 14, 2008

(65) Prior Publication Data
US 2008/0256447 A1    Oct. 16, 2008

Related U.S. Application Data

(60) Provisional application No. 60/911,394, filed on Apr. 12, 2007.

(51) Int. Cl.
G06F 3/00    (2006.01)
(52) U.S. Cl.
USPC .. 715/705; 707/100; 707/999.1; 707/E17.001
(58) Field of Classification Search
USPC ................ 715/705, 704; 709/217; 707/999.1
See application file for complete search history.

(56) References Cited

U.S. PATENT DOCUMENTS

| 6,496,979 | B1* | 12/2002 | Chen et al. ................. 717/178 |
| 6,799,205 | B2* | 9/2004 | Ludtke ....................... 709/220 |
| 6,934,774 | B1* | 8/2005 | Sundaram et al. ............. 710/19 |
| 7,082,576 | B2 | 7/2006 | Shahine et al. |
| 7,353,016 | B2* | 4/2008 | Roundtree et al. ......... 455/414.1 |
| 7,650,397 | B2 | 1/2010 | Price et al. |
| 7,730,492 | B1* | 6/2010 | Blaukopf et al. ............ 719/312 |
| 7,810,105 | B2* | 10/2010 | Prabandham et al. ........ 719/328 |
| 7,881,703 | B2* | 2/2011 | Roundtree et al. ......... 455/414.1 |
| 2004/0171375 | A1* | 9/2004 | Chow-Toun ................. 455/418 |
| 2004/0203646 | A1* | 10/2004 | Rudd et al. ................ 455/414.1 |
| 2006/0036941 | A1 | 2/2006 | Neil |
| 2006/0075344 | A1* | 4/2006 | Jung et al. .................... 715/705 |
| 2006/0090132 | A1* | 4/2006 | Jung et al. .................... 715/705 |
| 2006/0129932 | A1* | 6/2006 | Weber et al. ................. 715/705 |
| 2006/0165030 | A1* | 7/2006 | Fox et al. ..................... 370/328 |
| 2006/0229054 | A1* | 10/2006 | Erola et al. ................... 455/403 |
| 2008/0092057 | A1 | 4/2008 | Monson et al. |
| 2008/0127036 | A1 | 5/2008 | Kadur et al. |
| 2008/0194296 | A1 | 8/2008 | Roundtree |
| 2008/0282175 | A1 | 11/2008 | Costin et al. |
| 2008/0307385 | A1 | 12/2008 | Dreiling et al. |
| 2009/0254912 | A1 | 10/2009 | Roundtree et al. |

OTHER PUBLICATIONS

Adding Animated Prsentation Agents to the Interface., Thomas Rist. German Research Center for Artificial Intelligence Jan. 1997 IUI '97: Proceedings of the 2nd international conference on Intelligent user interfaces.*

(Continued)

*Primary Examiner* — Andrey Belousov
*Assistant Examiner* — Meseker Takele
(74) *Attorney, Agent, or Firm* — Perkins Coie LLP (57) ABSTRACT

A system and method for mapping input elements with actions performed by a mobile device is described. In some cases, the system creates an input map that is accessible by a generic guide script running on a mobile device. The guide script may access the input map in order to present tutorial information specific to the mobile device.

13 Claims, 9 Drawing Sheets

OTHER PUBLICATIONS

SNAPin Software Inc., "SelfService Server," <http://web.archive.org/web/20071213211055/www.snapin.com/prod_server.html>, internet accessed on Feb. 17, 2010, 2 pages.

U.S. Appl. No. 12/370,524, filed Feb. 12, 2009, System and Method for Building Applications, Such as Customized Applications for Mobile Devices.

* cited by examiner

METHOD AND SYSTEM FOR MAPPING A VIRTUAL HUMAN MACHINE INTERFACE FOR A MOBILE DEVICE

CROSS REFERENCE TO RELATED APPLICATIONS

This application claims priority to U.S. Provisional Patent Application No. 60/911,394, filed on Apr. 12, 2007, entitled METHOD AND SYSTEM FOR MAPPING A VIRTUAL INPUT FOR A MOBILE DEVICE, which is hereby incorporated by reference.

BACKGROUND

Service providers and device manufacturers implement processes in mobile devices in order to provide instructions or functionality to users of mobile devices. The processes may indicate to users the status of a device (e.g., a battery is low), or provide help to users in navigating the functions of the device (e.g., the device shows a pop up pointing to the button used to unlock the device).

However, currently implemented processes such as these suffer from being too general or too specific. In some cases, one process is developed for each type of device, which may be time consuming and costly to manufacturers. In other cases, one generic process is implemented across many devices, which is overly generalized such that users are often confused, leading to poor user experiences. These and other problems exist with respect to implementing such processes in mobile devices.

DETAILED DESCRIPTION

A system and method for mapping inputs on mobile devices will now be described. The system may create a table specific to the device, containing a list that relates user input actions and corresponding hardware on the device. In some examples, the system determines and relates coordinates of a hardware feature with coordinates of a displayed action.

The system, therefore, creates a list of user input actions simulated or taught by a guide script for a mobile device. The list is then stored in the mobile device, such as in a table. A guide script, operating system, or application running on the device may then look to the list stored on the device and display various actions using guidance derived from the stored table. Thus, the system enables a single or common guide script (or guide scripts) to be implemented into a number of different mobile devices without detracting from the respective mobile device's user experiences, among other things.

The technology will now be described with respect to various examples. The following description provides specific details for a thorough understanding of, and enabling description for, these examples of the technology. However, one skilled in the art will understand that the technology may be practiced without these details. In other instances, well-known structures and functions have not been shown or described in detail to avoid unnecessarily obscuring the description of the examples of the technology.

It is intended that the terminology used in the description presented below be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Suitable System

Figure 1:
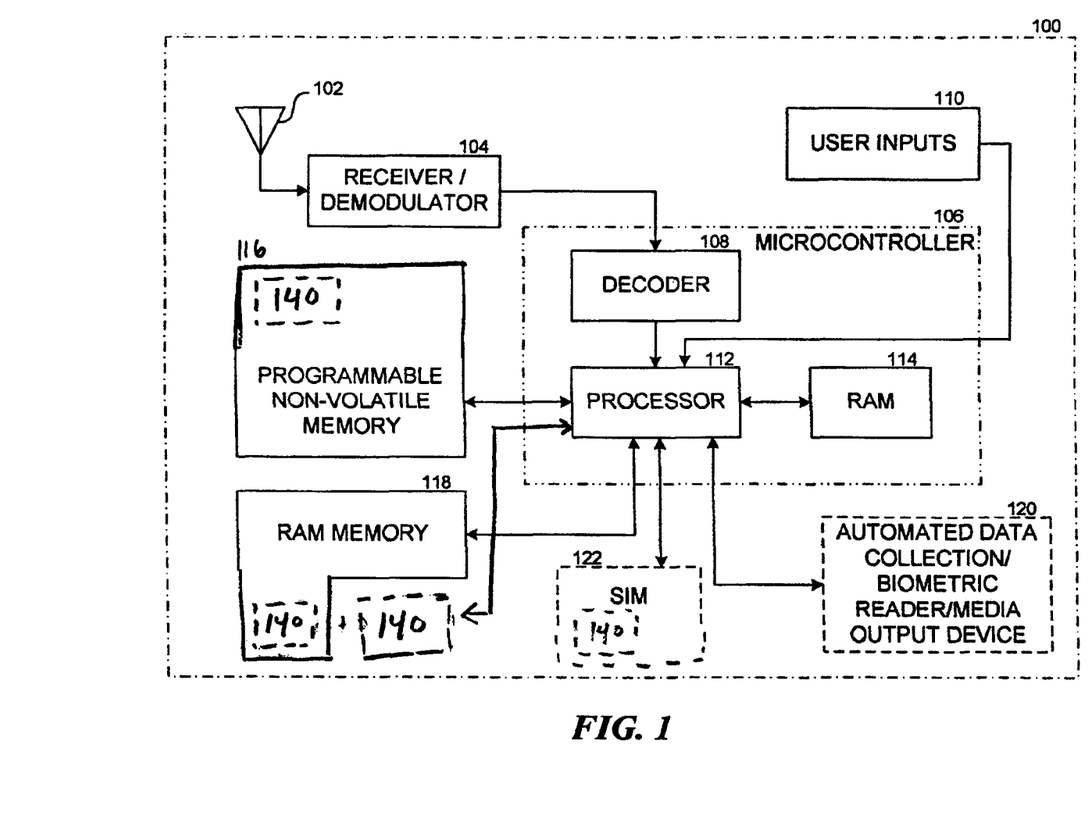
FIG. 1 is a schematic diagram illustrating a mobile device on which systems of abstracting devices to develop a guide script may be implemented.

FIG. 1 illustrates a mobile device 100 on which can be implemented in accordance with several examples of the technology. A receiver/demodulator 104 receives a transmitted signal via an antenna 102 and reconstructs the original transmitted signal. The transmitted signal is sent to a microcontroller 106, which consists of a decoder 108, a processor 112, and RAM (Random Access Memory) 114. The decoder 108 translates the signals into meaningful data and interfaces to other devices. Decoded data, along with subscriber inputs 110, are sent to the processor 112. In addition, the mobile device may include optional components, such as an automated data collection 120 unit linked to the processor 112, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, etc.) 120. The mobile device may also include a subscriber identity module (SIM) 122. The output of the processor 112 can be stored in a programmable non-volatile memory 116 or in the RAM memory 118.

The system may utilize many different output components, either alone or in combination, to provide instructions to users. Examples of these output components include: display screens, projectors, 3D displays, loudspeakers, headsets, earpieces, and so on. In some cases, the mobile device is wired or wirelessly connected to another device containing the output component(s). For example, the system may present audio instructions to a user via a Bluetooth headset, may transmit instructions to a nearby display screen (such as a TV or computer monitor), may transmit instructions via a vehicle navigation system (containing visual display and audio output components) in communication with a user's mobile device, and so on.

Memory 116, 118, or memory of the SIM card 122 may contain a guide script component 140 that provides data, scripts, applications and other information required to create the tables and lists described herein 100. Additionally, the device may contain a guide script component 140 (described herein) as a separate component outside of the device memory components 116, 118 or the SIM device 122.

FIG. 1 and the discussion herein provide a brief, general description of a suitable telecommunications or computing environment in which the technology can be implemented. Although not required, aspects of the technology are described in the general context of computer-executable instructions, such as routines executed by a general-purpose computer, e.g., mobile device, a server computer, or personal computer. Those skilled in the relevant art will appreciate that the technology can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the technology can be embodied in a special purpose computing device or data processor that is specifically programmed, configured, or constructed to perform one or more of the computer-executable instructions explained in detail herein. Aspects of the technology may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the technology reside on a server computer, while corresponding portions reside on a client computer such as a mobile or portable device, and thus, while certain hardware platforms are described herein, aspects of the technology are equally applicable to nodes on a network. In an alternative embodiment, the mobile device or portable device may represent the server portion, while the server may represent the client portion.

While the examples herein employ software stored on the mobile device, the scripts and other software described herein may be hard coded into the mobile device (e.g. stored in EEPROM, PROM, etc.). Further, the above functionality may be implemented without scripts or other special modules.

The system may also implement guide scripts and other components described here in appliances and other consumer devices. For example, the system may facilitate a user learning about certain functions of a refrigerator, washing machine, television, and so on.

Abstracting User Inputs

Figure 2:
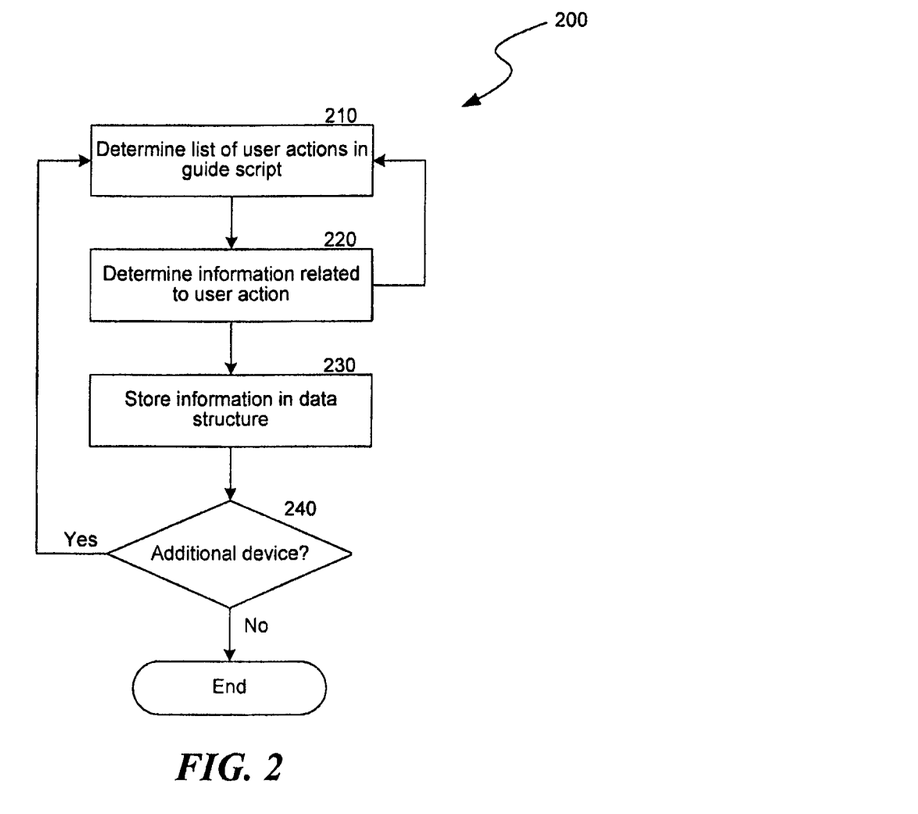
FIG. 2 is a flow diagram illustrating a method of creating input maps for mobile devices.

As described herein, a guide script component 140 or other user help process components are configured to create a list of user input actions and associated hardware features for mobile devices, such as device 100. Referring to FIG. 2, a flow diagram illustrating a routine 200 for creating input maps or visual user guides on mobile devices is shown. The system may perform some or all steps of routine 200 when creating input maps to use with guide scripts on mobile devices.

Beginning at block 210, the system determines a list of user actions or phone features associated, simulated, or taught in a guide script. Example user actions/phone features include:

How to make a phone call;
How to recharge the device;
How to change the device's batteries;
How to send an SMS;
How to "lock" the device's buttons (in order to avoid accidental presses);
How to take a picture;
How to send a picture to a friend using picture messaging;
How to play music;
How to change a ringtone;
How to adjust ring volume;
How to access the internet
How to enable picture sharing;
How to backup a contact list;
How to use device as a data connection;
How to use instant messaging;
How to use speed dial;
How to play games;
How to watch TV;
How to use Wi-Fi calling, and so on.

In block 220, for a given mobile device, the system determines information related to user actions. The system may determine if the user action is supported by the device or the guide script. When supported, the system may determine what hardware feature (or more than one features) of the device accomplishes the user input action. For example, the system may determine the specific button or series of buttons/inputs on the device associated with the user action. The system may also identify a user action or actions that accomplish the user input using the hardware feature. For example, the system may determine that the user presses a specific button to implement the action. Thus, a table or data structure may be created that maps each function to a corresponding button(s) or hardware feature(s) for each mobile device model to be supported.

In block 230, the system stores this information into a data structure, such as a table, list, map, database, itemized group of entries, or other suitable grouping of actions and user inputs. Routine 200 may proceed back to block 220 and determine information for additional actions. Once the system completes a mapping or partial mapping of a device, routine 200 proceeds to decision block 240 and determines if there are additional devices to map. If there are additional devices, routine 200 proceeds to block 220 and creates a map for the additional device. If there are no additional devices, routine 200 ends.

Once the system creates a mapping, it may push it wirelessly to specific mobile devices, which would receive and store it within non-volatile memory of the device. Alternatively, the manufacturer of the mobile device may store the mapping in memory. These mappings may relate to tutorials, help screens or other information provided to a user (or for other purposes). A single program or script relating to inputs and outputs of mobile devices may be generated for a wide array of devices, regardless of the hardware specifics of each device. Thus, in one example, a single tutorial may be created on the use of a generic mobile device, and that tutorial modified for specific models of devices through the created mapping. That tutorial may be pushed wirelessly (e.g. as a script) to mobile devices and stored within the device. Examples are provided herein.

Overall, the same basic guide script may be used across different devices (e.g., devices from different manufacturers, devices with different operating systems, devices bearing different model numbers, etc.). Thus, user guides for similar functions on disparate hardware can be readily created with a common script or routine.

In addition to the information mapped above, the system may map other features and functionality. The guide script may identify and/or determine if the script is able to simulate an input action and if so, how the script simulates the action. For example, the system may record the scan code for a particular button, how long that button is to be pressed, etc.

In addition, the system may map touchscreen based input functions to actions performed by a mobile device. For example, the map may include touchscreen coordinate information, touchscreen location information, sequence information, gesture information, movement information, and so on. That is, in some cases the system may map of a sequence of movements performed by a user on a touchscreen input to actions performed by the mobile device.

The system may also determine device coordinates for associated hardware, coordinates for associated user interface displays, or both, and implement this information into the guide script table of the device. If a digital image (or other multimedia feature such as an animation or sound sequence) of the device is used with the guide script (such as to show the position of a hardware feature associated with a user input action), the system may store the coordinates or location of the image, information related to the shape of the image, and so on into the guide script table. For example, a specific location on a bit map image of one device, or on a specific location on the display of the device (displaying a particular image), may correspond to the "7" key, while on the image of another device to the "#" key.

As discussed herein, the input may be a data structure that relates and/or associates (1) actions (such as actions performed by a mobile device or by a user with the mobile device) and (2) input components and/or related gestures, movements, and/or interactions performed by a user with the input components. For example, table 1 shows an example mapping of information associated with actions and information associated with inputs that correspond to a mobile device performing the action. In some cases, a guide script running on the mobile device may access such a table when presenting a tutorial to a user.

TABLE 1

| Action | Input Component | Input Identifier |
| --- | --- | --- |
| Send a picture | 4 on keypad | left, middle |
| Play mp3 | 7 on keypad | left, bottom |

Of course, the table (and other tables, maps, and so on) may include additional or different information, such as the information associated with actions and information associated with various input components discussed herein. Such tables may represent data structures created by the system, stored in a phone, etc.

Example User Interfaces

Figure 3A:
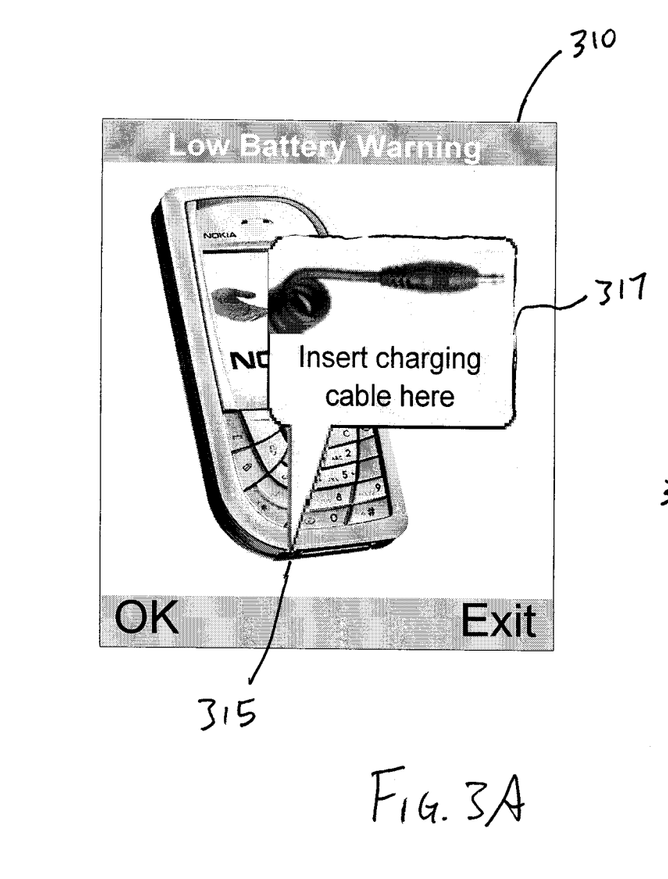
FIGS. 3A-3B are mobile device screens illustrating user interfaces for guide scripts on mobile devices.
Figure 3B:
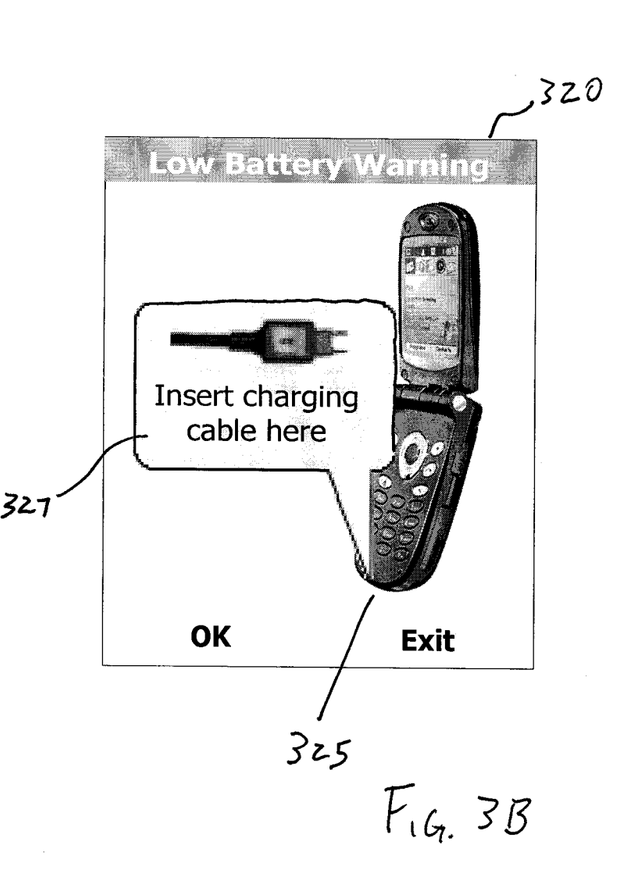

Referring to FIGS. 3A-3B, device screens illustrating user interfaces for a common guide script on two different mobile devices are shown. In the Figures, a first mobile device contains screen 310, and a second mobile device contains screen 320. Using the system, the same guide script may run across both devices, using device specific information for the respective devices. For example, screens 310 and 320 illustrate an instance when the devices have a low battery. A guide script on each device is configured to present a help display that shows a picture of the device and an instruction bubble that points to the input of the device in the picture and instructs a user to "Insert charging cable here," with a picture of the appropriate cable to be inserted.

As shown in the Figures, both screens 310 and 320 show a picture of the respective device and the help bubble, as the guide script instructs the devices to show these features. Using device specific information derived from tables stored on the devices, the system, on the first device, presents bubble 317 on screen 310, pointing to the cable input 315, and the system, on the second device, presents similar bubble 327 on screen 320, pointing to the cable input 325.

The system, therefore, provides a similar instruction guide in both devices while maintaining specific user experiences for the devices. In other words, the functions are nearly identical between the two devices, but the steps to implement the functions differ because the hardware configurations between the devices differ.

Figure 4A:
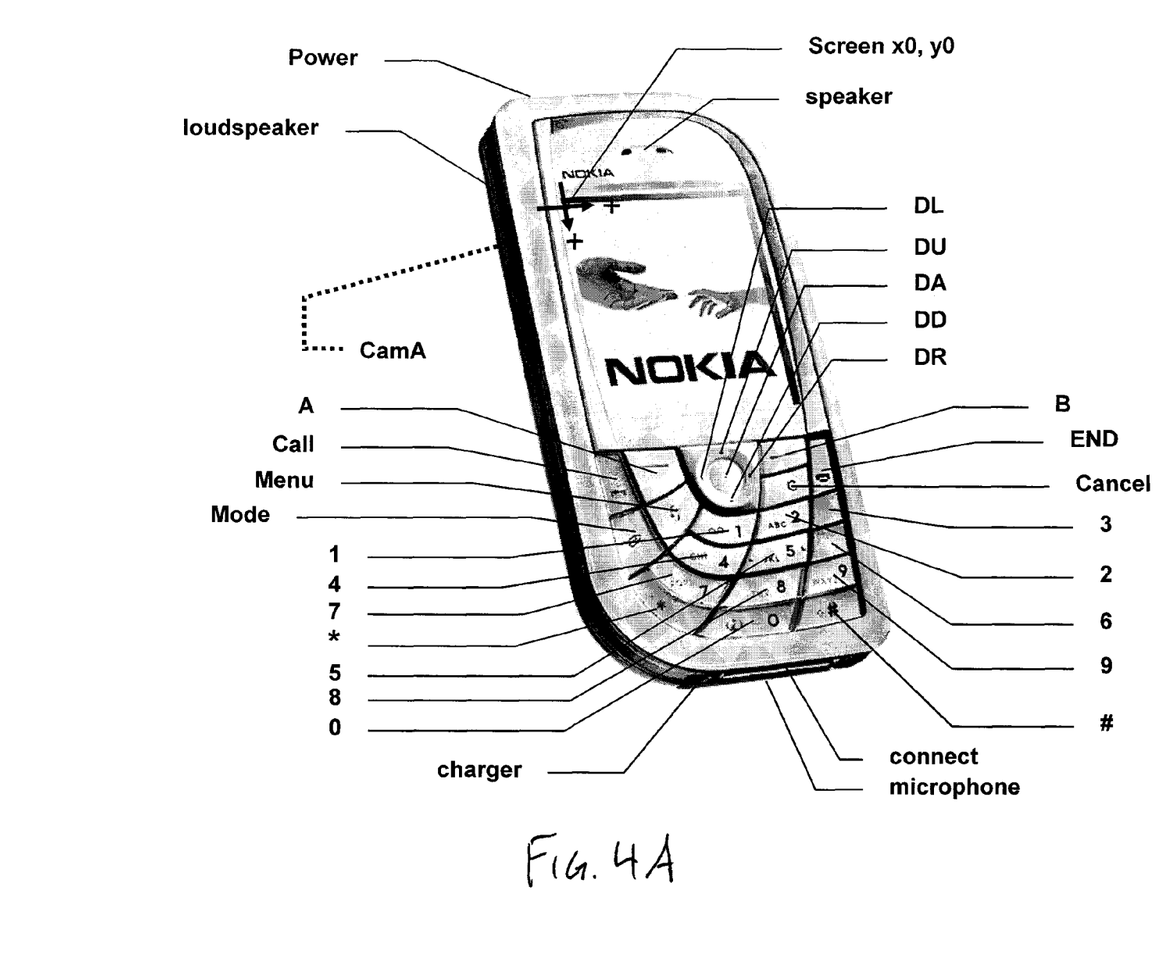
FIGS. 4A-4F are diagrams of example maps for various mobile device types, with call outs designating functions or values associated with each depicted input or output item for the various mobile devices.
Figure 4B:
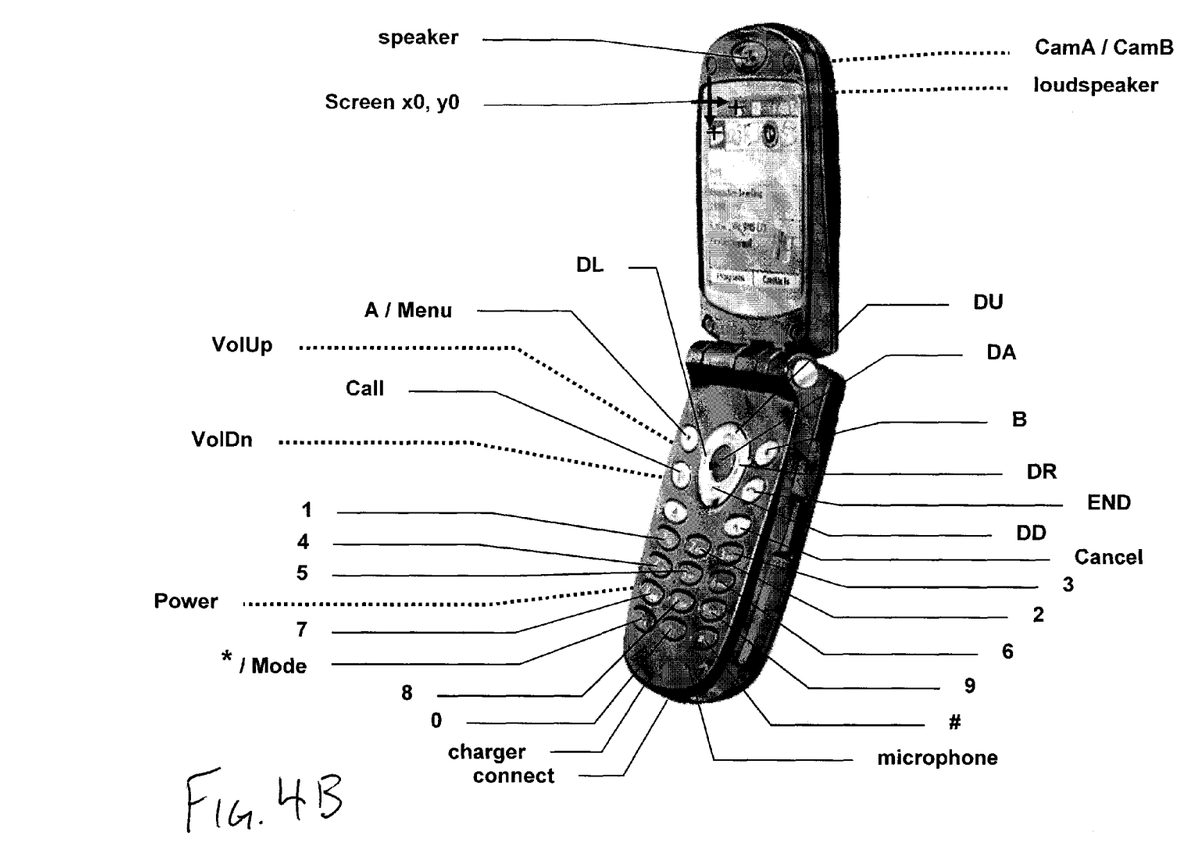
Figure 4C:
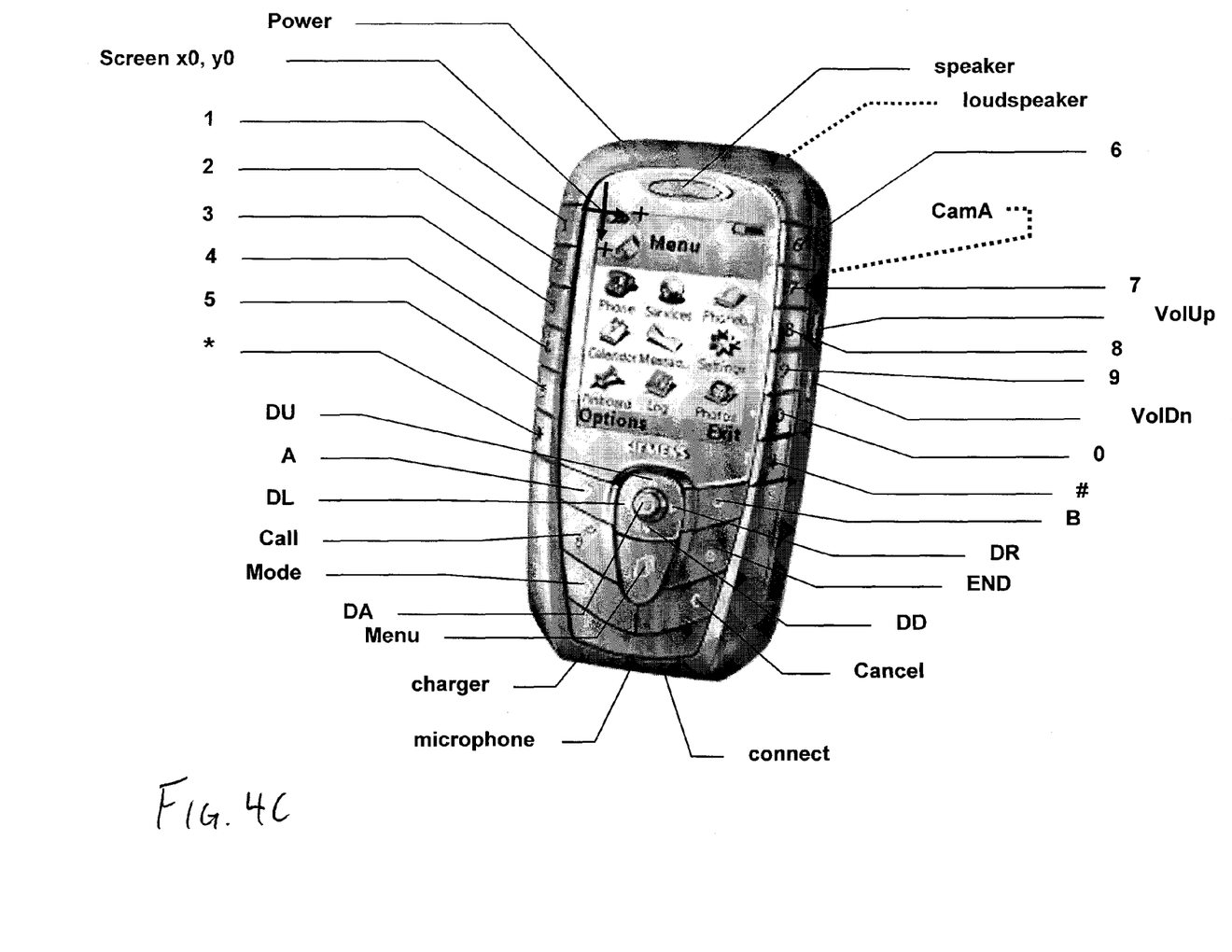
Figure 4D:
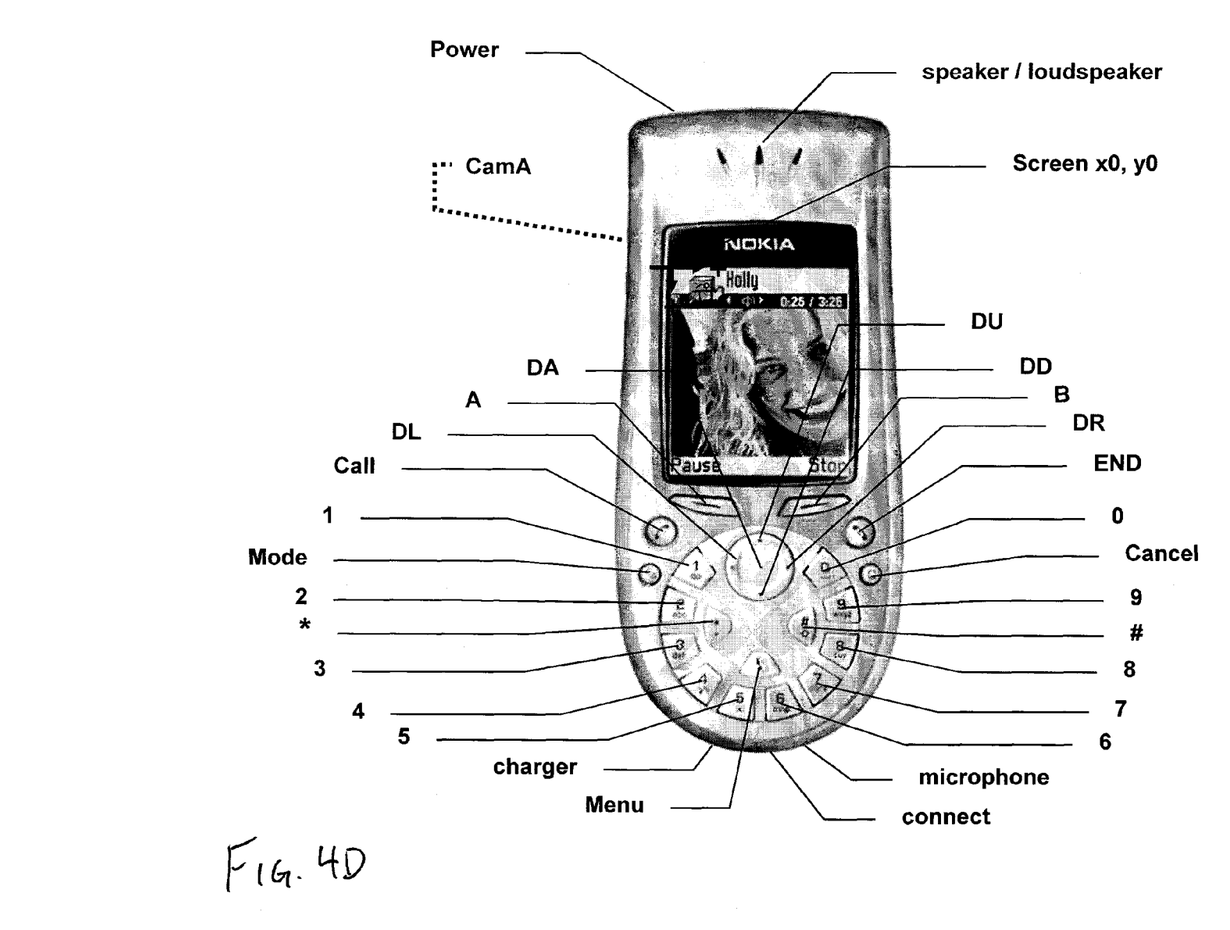
Figure 4E:
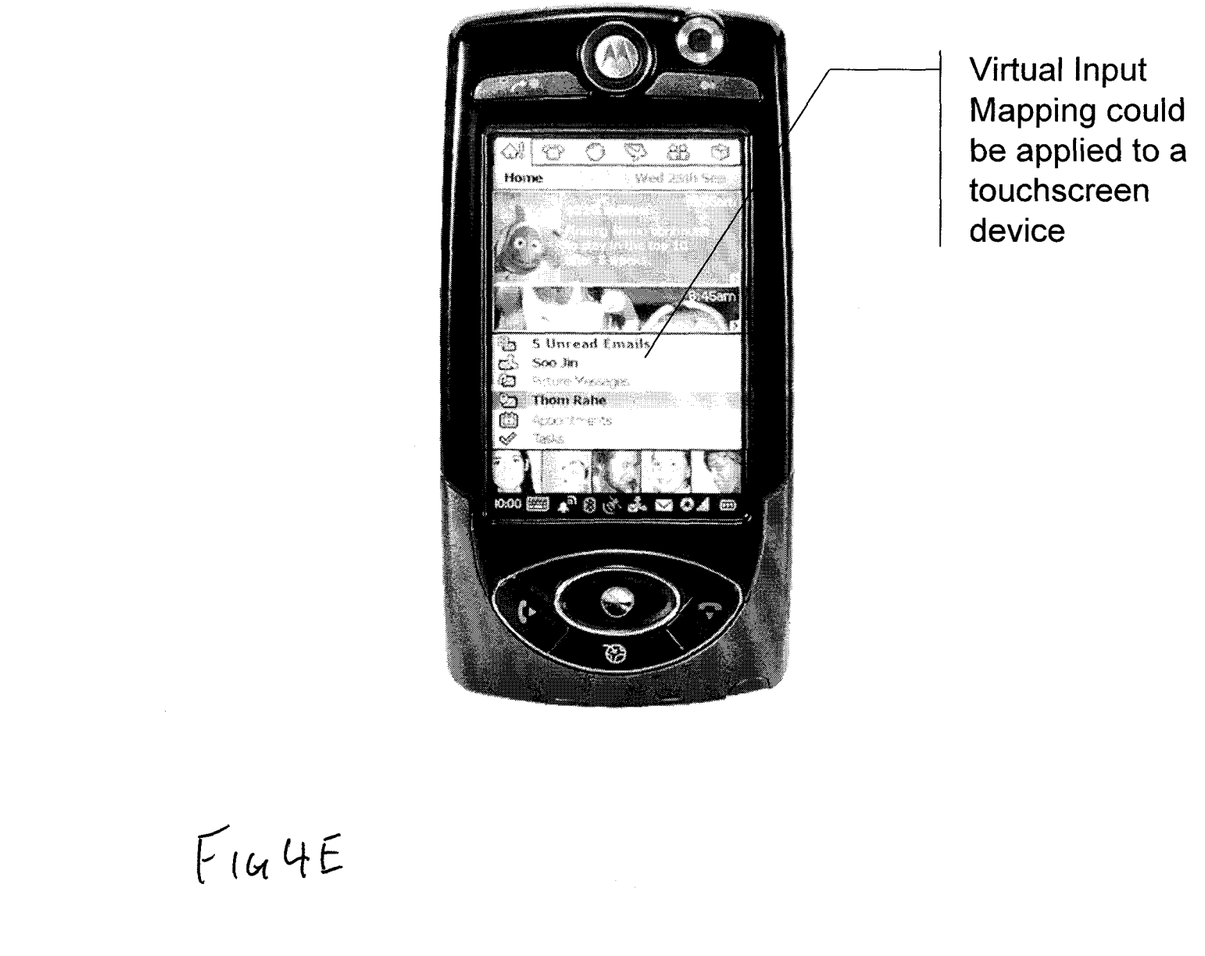
Figure 4F:
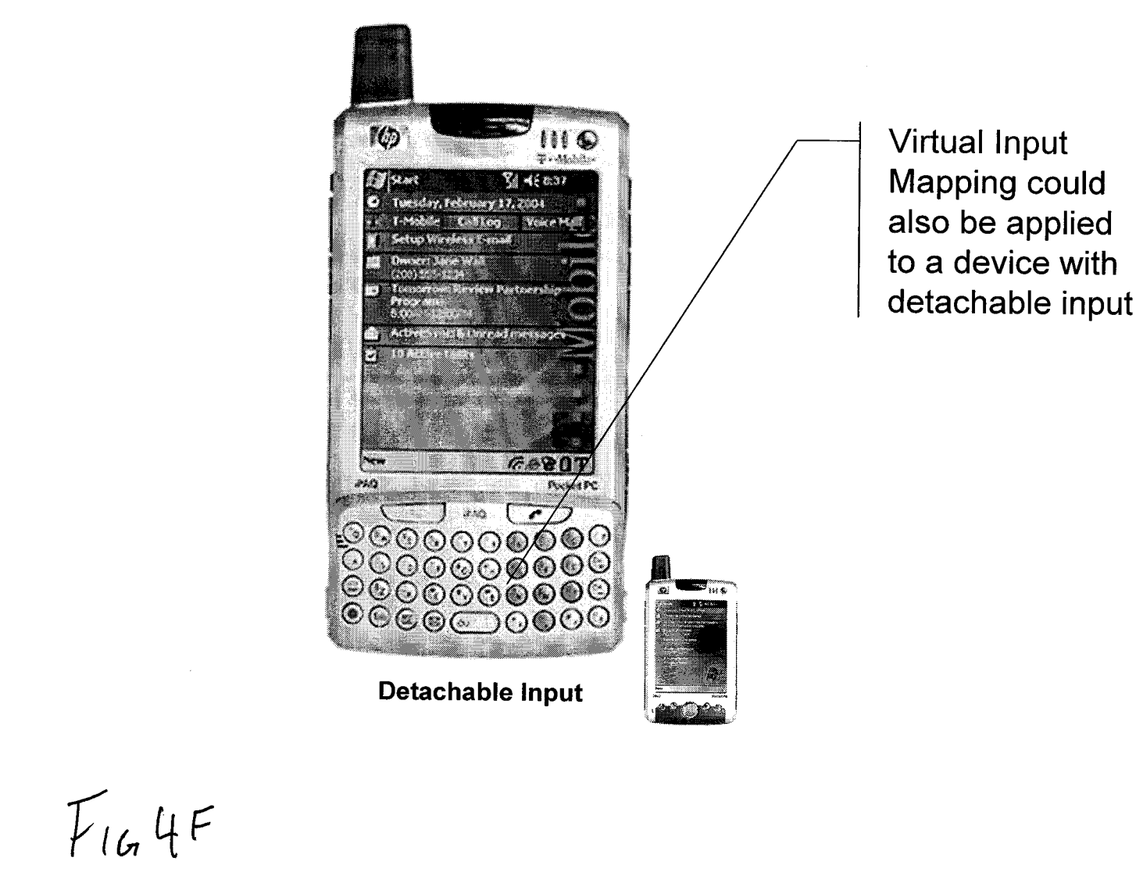

Referring to FIGS. 4A-4F, diagrams of example maps for various mobile devices types are shown. FIG. 4A shows a Nokia model 7610, which may run the Symbian OS 7.0/Series 60 Version 2, while FIG. 4B shows a Motorola model MPX200, which may run the Windows Mobile 2003 operating system. FIG. 4C shows the Siemens model SX1 S60, which may run the Symbian operating system OS 6.1/Siemens custom. FIG. 4D shows the Nokia model 3650, which may run the Symbian OS 6.1/Series V1. FIG. 4E shows the Motorola A1000, running the Symbian OS 8/UIQ, and FIG. 4F shows the Hewlett Packard IPAQ H6300, which may run the Microsoft Windows mobile pocket PC phone edition operating system. These Figures show examples of maps that use realistic 3D images, 3D coordinates, 3D vectors, or other information for the devices in order to create the lists and tables described herein for mapping steps, user input, device output, or other features for instructing a user on certain common functions applicable to these devices, but where implementing those functions differ based on the physical layout and operating systems/software between the devices.

Thus, the system creates and stores a table or other data structure on a mobile device that contains device specific information for the device. A guide script, or other script utilizing device specific information, may then look to and extract information from the table when providing guidance to a user. But, similar scripts having common steps, functions or programming elements may be provided to a wide array of physically differing devices.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only certain aspects of the invention are recited as embodied in a computer-readable medium or article of manufacture, other aspects may likewise be embodied form, or in other forms, such as in "means for [performing a function]". (Any claims intended to be treated under 35 U.S.C. §112, ¶6 will begin with the words "means for".) Accordingly, the applicant reserves the right to add additional claims after filing the application to pursue such additional claim forms for other aspects of the invention.

We claim:

1. A method for use with a mobile device, the method comprising:
for multiple, different models of mobile devices
identifying a first hardware feature for a mobile device, the mobile device selected from the multiple, different models of mobile devices,
wherein the mobile device receives user input via the first hardware feature; and
determining that a guide script running on the mobile device provides instructions to a user of the mobile device for a first action;
associating, after the determining, the first hardware feature with the first action performed by the mobile device;
storing the association in a list stored locally on the mobile device,
wherein the list is accessed by the guide script, wherein the guide script that does not contain device specific information;
identifying a second hardware feature for the mobile device,
wherein the mobile device also receives user input via the second hardware feature; and
associating the second hardware feature with a second action performed by the mobile device; and
storing the association in the list stored locally on the mobile device;
wherein, for at least a first mobile device of the different models of mobile devices and a second mobile device of the different models of mobile devices, the association of the first hardware feature with the first action for the first mobile device differs from the association of the first hardware feature with the first action for the second mobile device.

2. The method of claim 1, further comprising:
receiving a request to provide instructions related to the first action to a user;
retrieving the association between the first hardware feature and the first action performed by the mobile device; and
displaying instructions to the user based on the retrieved association, wherein the displayed instructions include information associated with the first action and information identifying the first hardware feature.

3. The method of claim 1, wherein the first action relates to transmitting information from the mobile device to another mobile device.

4. The method of claim 1, wherein the first action relates to performance of the mobile device.

5. The method of claim 1, wherein the first action relates to a non-calling feature of the mobile device.

6. The method of claim 1, wherein the first hardware feature is a key on a keypad of the mobile device.

7. The method of claim 1, wherein the first hardware feature is an input element displayed by a screen of the mobile device.

8. A system for presenting a tutorial to a user of a mobile device of a first model, the system comprising:
an input map component,
wherein the input map component determines that a script provides instructions to a user of the mobile device for the first action,
wherein the input map component includes one or more first data structures, created after the determining, that relate possible actions performed by the mobile device of the first model with corresponding user input elements that receive user input in order to perform the possible actions, such that the first data structures of the mobile device of the first model are different from one or more second data structures of a second mobile device of a model different from the first model, and wherein the relations in the first data structures are different from the relations in the second data structures;
a tutorial component,
wherein the tutorial component is configured to execute the script stored on the mobile device of the first model that generates a tutorial for a user of the mobile device of the first model, and,
wherein the script is a generic guide script that can be used on multiple device models and is used to retrieve one or more of the possible actions from the input map component based at least in part of a current or previous state of the mobile device of the first model; and
a display component,
wherein the display component is configured to display the tutorial to the user, and,
wherein the displayed tutorial includes information associated with the retrieved one or more possible actions and information associated with the corresponding input elements.

9. The system of claim 8, wherein the information associated with the corresponding element includes information visually identifying the corresponding input element.

10. The system of claim 8, wherein the information associated with the retrieved one or more possible actions includes information instructing a user how to implement the one or more possible actions.

11. The system of claim 8, wherein the data structure relates at least one action performed by the mobile device with corresponding coordinates of the input element that facilitates performance of the action.

12. An article of manufacture comprising a tangible computer-readable memory storing computer-executable code, wherein the computer-executable code, when executed by at least one computer, performs a method of:
for each of multiple, different models of mobile devices,
accepting at least one input element from one mobile device, selected from the multiple, different models of mobile devices;
identifying functions performed by the one mobile device model from the multiple, different models of mobile devices;
associating, after the determining, at least one input element, of multiple input elements for the one mobile device model, with performance of each of the identified functions in response to when the device would receive input from the user via the input element;
generating a correlation of the identified functions with the associated input elements of the one mobile device model,
wherein the correlation of the identified functions with the associated input elements of the one mobile device model differ from a correlation of the identified functions to other associated input elements for another of the multiple mobile device models; and
providing the generated correlation for storage within the multiple, different models of mobile devices,
wherein the correlation is accessible to the tutorial scripts, the tutorial scripts generic to the multiple, different models and configured to perform tutorials on mobile device models based at least in part on the generated correlations stored within the mobile device models.

13. The article of manufacture of claim 12 wherein the correlation includes touchscreen coordinate information, touchscreen location information, or touchscreen gesture information to correlate of a sequence of movements performed on a touchscreen to actions performed by the mobile device.

* * * * *